Feb. 25, 1936.     A. G. ZIMMERMAN     2,031,809
CAMERA MOUNTING
Filed Jan. 31, 1934

INVENTOR
ARTHUR G. ZIMMERMAN
BY
ATTORNEY

Patented Feb. 25, 1936

2,031,809

UNITED STATES PATENT OFFICE 2,031,809

CAMERA MOUNTING

Arthur G. Zimmerman, Westmont, N. J., assignor to Radio Corporation of America, a corporation of Delaware Application January 31, 1934, Serial No. 709,078

5 Claims. (Cl. 88—16.2)

The present invention relates to a camera mounting, and particularly to a device adapted to be supported upon a tripod and to mount a sound and picture camera and to hold the amplifier equipment and batteries therefor in proper relation thereto.

One object of my invention is to provide a camera mount which will be perfectly balanced in all positions of the camera.

Another object of my invention is to provide a camera mount which will hold a sound and picture camera rigid in relation to the amplifier therefor.

Another object of my invention is to provide a camera mount which will hold an amplifier in such relation to the camera that the various indicators on the amplifier are readily visible to the operator of the camera.

Another object of my invention is to provide a mount for holding an amplifier in such relation to a motion picture camera that the controls of the amplifier are readily accessible to the operation of the camera.

Another object of my invention is to provide such a mount which will hold the amplifier and battery cases without defacing them.

Figure 1:
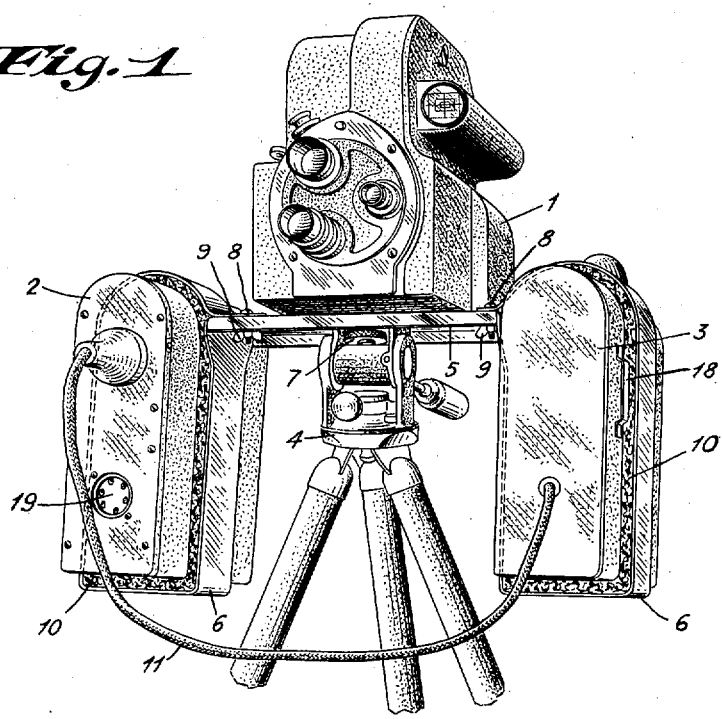
Fig. 1 is a front view of my improved camera mounting shown in place upon a tripod and with the amplifier and battery cases and the camera in operative position.

The device of my invention is shown in the drawing as set up for use in conjunction with an RCA Victor 16 mm. sound and picture camera which is provided with a battery box 2 and an amplifier box 3, the entire group of apparatus being supported, through the use of the device of this invention, upon the tripod 4.

My improved camera support involves a cross-member 5 adapted to be secured to the top of the tripod 4, and a plurality of yokes 6 attached to the said cross-member.

The cross-member 5 is made in the form of a channel of sufficient width to fit over the top of the tripod, and is provided with a central orifice through which the camera clamping screw 7 of the tripod 4 may pass. This clamping screw fits into the usual socket in the base of the camera 1 and the camera and clamping screw therefore hold this cross-member 5 firmly on the top of the tripod. The yokes 6 consist of metal straps bent to the shape shown and secured to the channel member 5 by bolts 8 and wing nuts 9 so that the apparatus can be readily dis-assembled without the use of tools. The yokes 6 are each provided with a lining of sponge rubber 10 which serves several purposes: due to the resilience of the sponge rubber the cases 2 and 3 are held firmly in the yokes in spite of slight variations in the dimensions of the cases or yokes since an accurate fit is not necessary, and the sponge rubber prevents abrasion of the cases by the yokes. It also serves to insulate the amplifier from mechanical disturbances.

It will be noted that the amplifier and battery cases are held rigid in their relation to the camera by the mounting device, and this rigid relation permits me to counter-balance the camera in a novel fashion. The amplifier and battery cases are mounted at such a height in relation to the horizontal axis of movement of the tripod that they will accurately counter-balance the weight of the camera, and the camera and the said cases will remain accurately in equilibrium at all positions of elevation or depression of the camera as distinguished from the top-heavy effect of the camera alone.

An appropriate cable 11 connects the batteries within the case 2 to the amplifier in the case 3, and another appropriate cable 12 connects the amplifier to the recording galvanometer 13 of the camera.

Figure 2:
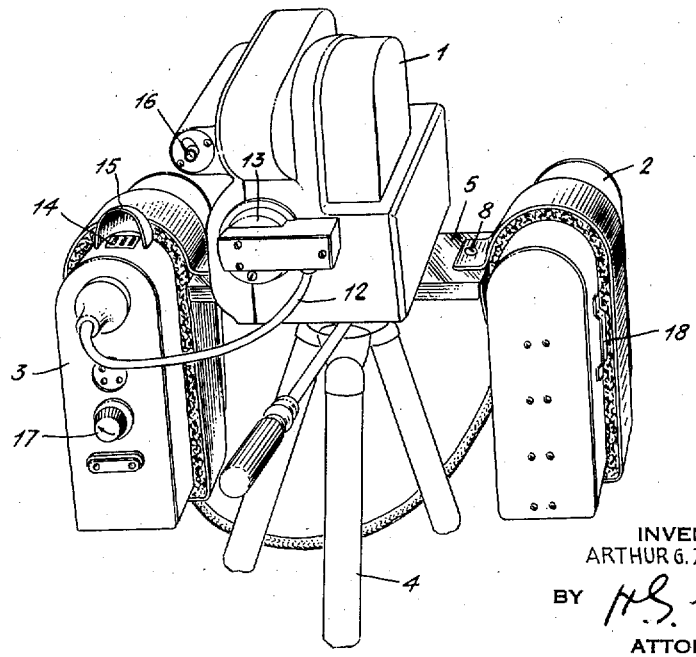
Fig. 2 is a rear view of the arrangement shown in Fig. 1 and showing the relative positions of the various indicators and controls.

The amplifier is provided with a volume indicator 14 which is shielded from stray light by the cover 15 and it will be apparent from Fig. 2 that my device holds the amplifier in such position that this volume indicator can be readily viewed by the operator of the camera without the necessity for his removing his eye an appreciable distance from the finder 16.

The volume control 17 of the amplifier is conveniently close to the operator's left under any normal operative position of the device.

The particular amplifier and battery boxes shown are provided with straps 18 by which the cases 2 and 3 can be mounted on the operator's belt if he desires to operate the camera in his hands instead of upon a tripod, and in transporting the apparatus it is usually convenient to carry the amplifier and the battery box either in such fashion or by a strap over the shoulder. It will be apparent that when it is desired to set up the apparatus on a tripod, it is merely necessary for the operator to place the casings 2 and 3 in the yokes 6 which are then tightened to the cross-member 5 by the wing nuts 9. The cross-member 5 is then placed in the tripod, the camera placed on top of it, and the screw 7 tightened.

Any appropriate microphone can be connected to the apparatus by connecting the cable thereof to the receptacle 19.

I claim:

1. A support for talking motion picture apparatus comprising a cross-bar adapted to be supported upon a tripod, and clamped thereto by a motion picture camera resting upon the cross-bar, and a yoke at each end of said cross-bar adapted to support an amplifier and a battery box in balanced relation with each other and with said camera.

2. A support for talking motion picture apparatus comprising a cross-bar adapted to be supported upon a tripod, and clamped thereto by a motion picture camera resting upon the cross-bar, a yoke at each end of said cross-bar adapted to support an amplifier and a battery box in balanced relation with each other and with said camera, and a sponge rubber lining in each of said yokes.

3. A support for talking motion picture apparatus comprising a cross-bar adapted to be supported upon a tripod, and clamped thereto by a motion picture camera resting upon the cross-bar, and a yoke at the bottom of each end of said cross-bar adapted to support an amplified and a battery box in balanced relation to each other and to the camera.

4. A support for talking motion picture apparatus comprising a cross-bar adapted to be supported upon a tripod and clamped thereto by a motion picture camera resting upon the cross-bar, a yoke at each end of said cross-bar adapted to support an amplifier and a battery box in balanced relation to each other and to the camera, and a sponge rubber lining in each of said yokes.

5. A mount for a talking motion picture camera adapted to be supported upon a movable tripod head comprising means for supporting a camera above said mount, and means for supporting an amplifier adapted to actuate said camera and a battery adapted to actuate said amplifier in balanced relation below said mount, whereby said camera, said amplifier, and said battery are maintained in balanced equilibrium about all axes of motion of said tripod head.

ARTHUR G. ZIMMERMAN.